United States Patent [19]
Vannan, Jr.

[11] 3,891,740
[45] June 24, 1975

[54] METHOD FOR FORMING AN INJECTION MOLDED TIRE USING MOLDED REINFORCING PLIES

[75] Inventor: Frederick F. Vannan, Jr., Danville, Va.

[73] Assignee: The Goodyear Tire & Rubber Company, Akron, Ohio

[22] Filed: May 5, 1972

[21] Appl. No.: 250,702

[52] U.S. Cl. .............. 264/263; 264/326; 264/328
[51] Int. Cl. ............................................. B29h 17/00
[58] Field of Search .......... 264/255, 261, 262, 263, 264/326, 328; 152/354, 357; 156/110 R, 111, 125

[56] References Cited
UNITED STATES PATENTS

| | | |
|---|---|---|
| 2,569,935 | 10/1951 | Legnillon et al. ................ 156/125 |
| 2,724,425 | 11/1955 | Ostling ............................... 156/125 |
| 2,757,701 | 8/1956 | Henson ........................... 264/326 X |
| 2,897,540 | 8/1959 | Rhodes ............................... 156/125 |
| 3,017,391 | 1/1962 | Mottus et al. ...................... 260/78 L |
| 3,229,013 | 1/1966 | Newton et al. .................. 156/125 X |
| 3,505,448 | 4/1970 | Zijp et al. ........................... 264/328 |

FOREIGN PATENTS OR APPLICATIONS 1,526,075   5/1968   France

Primary Examiner—Robert F. White
Assistant Examiner—W. E. Hoag
Attorney, Agent, or Firm—F. W. Brunner; J. D. Wolfe

[57] ABSTRACT

A method of forming a ply by injection molding a fluid material such as polyester or polyamide and congealing to form a ply or plies, placing said plies in a mold and injecting in a fluid precursor material which when cured yields a tire having ply reinforcement.

6 Claims, 10 Drawing Figures

PATENTED JUN 24 1975
3,891,740
SHEET 1
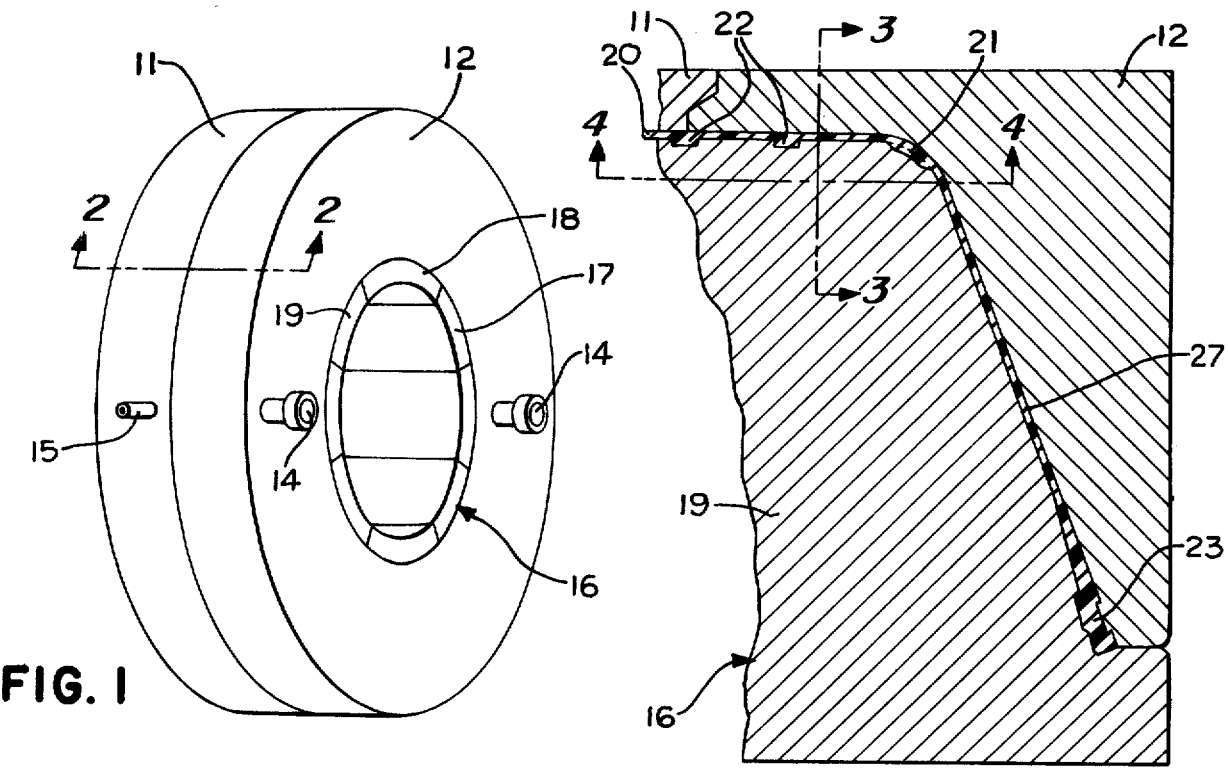
FIG. 1
FIG. 2
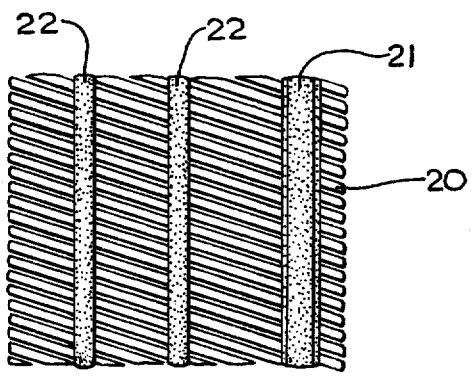
FIG. 4
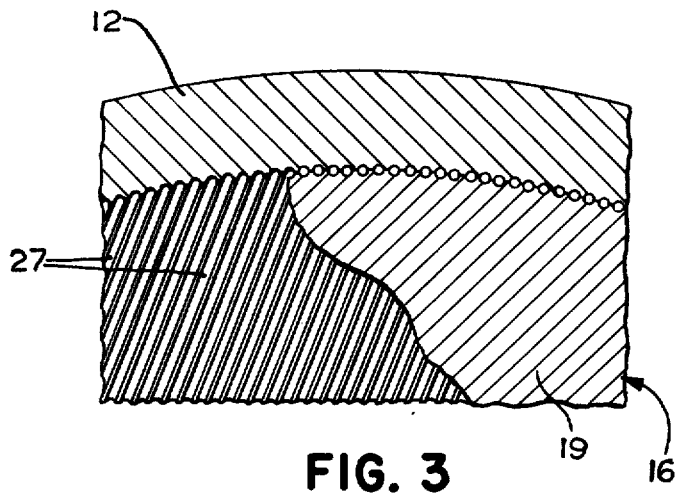
FIG. 3
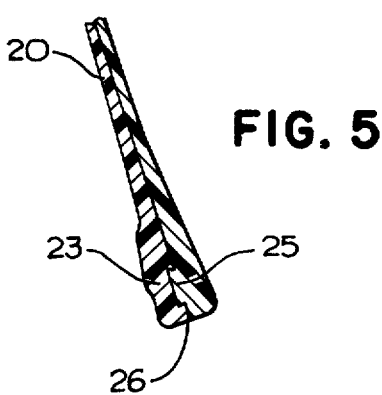
FIG. 5

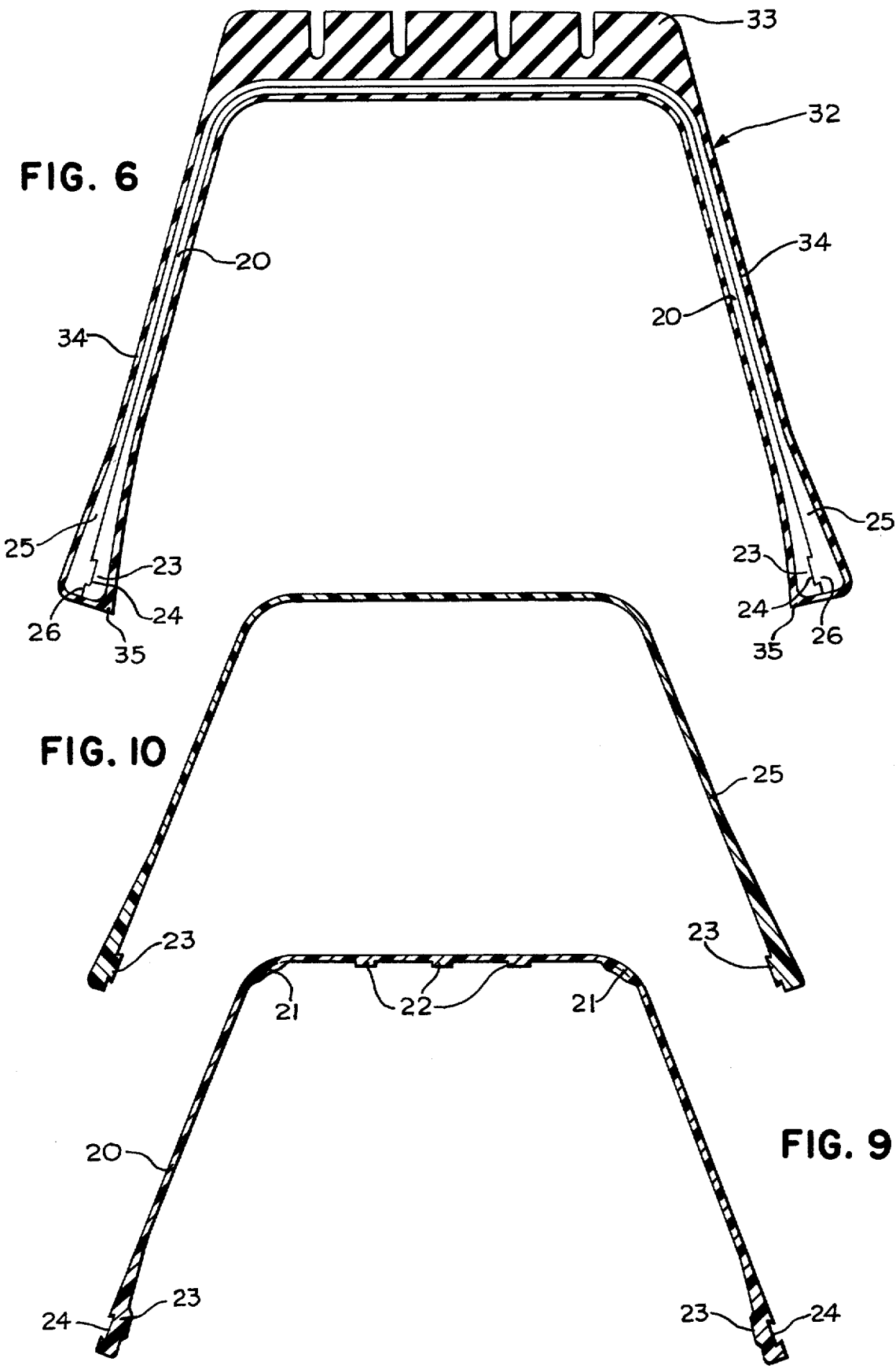

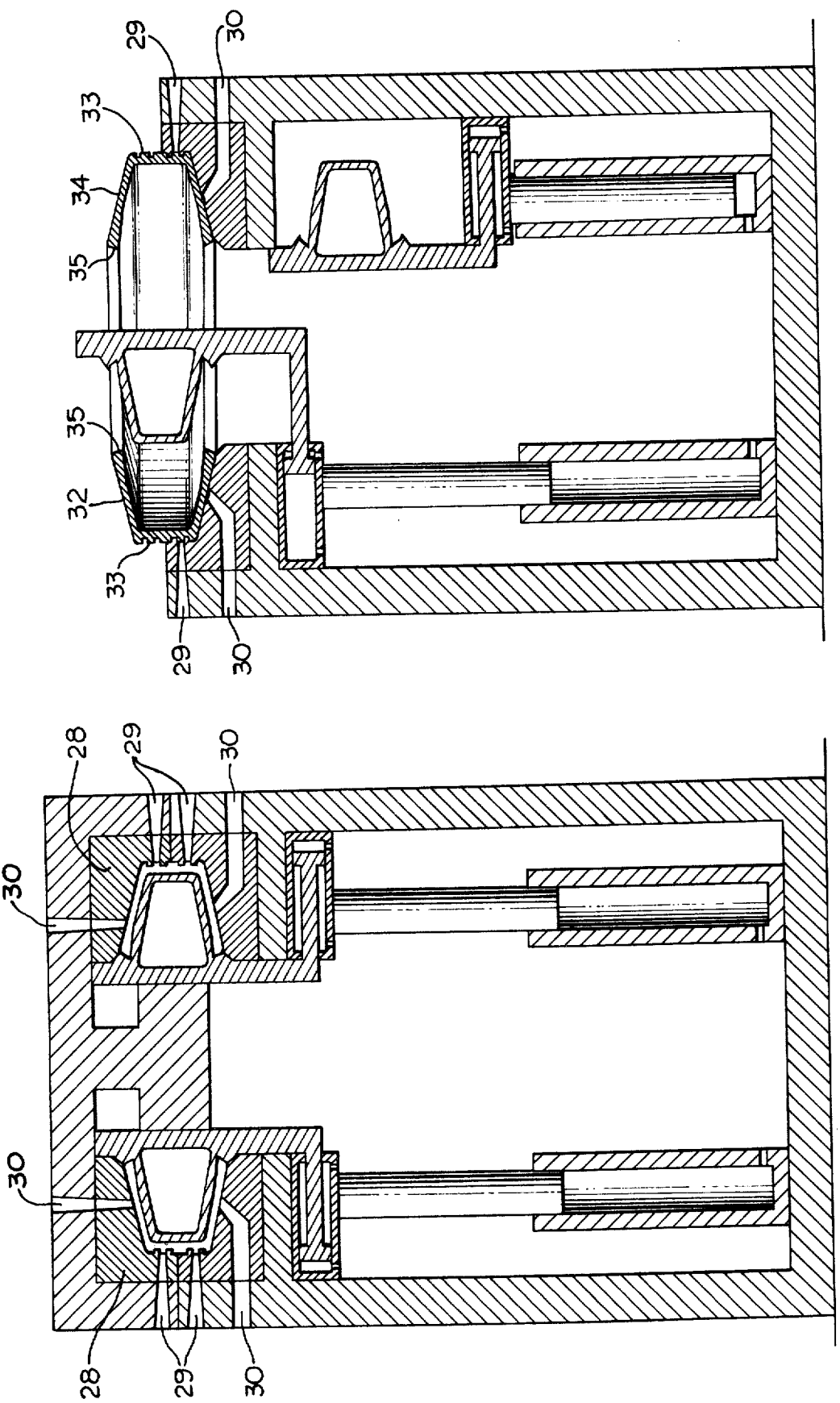

METHOD FOR FORMING AN INJECTION MOLDED TIRE USING MOLDED REINFORCING PLIES

This invention relates to a method of making a fabric or a filament reinforced tire and to said tire. More particularly, this invention relates to a method of making a fabric or filament reinforcing component of a tire having a single or multiple ply construction, to said construction, to said component and tire, as well as construction of an elastomeric matrix to support the reinforcing component.

It has been the desire ideally of the tire designer and builder to build a tire using essentially the fabric and rubber precursors to thereby eliminate the steps of spinning and shaping the fabric and/or compounding and extruding, and cutting the rubber as well as the elimination of the conventional tire building steps.

Therefore, an object of this invention is to present a method of building a fabric reinforced tire that permits this ideal to be more nearly approximated.

The nature of this invention can be more readily understood by reference to the drawings wherein FIG. 1 is a perspective view in elevation of a mold for molding the fabric or filament composition to form or shape a ply of a reinforced tire.

FIG. 2 is a partial cross-sectional view of the mold of FIG. 1 along line 2—2 showing the fabric of filament component or ply in the cord path direction.

FIG. 3 is a partial cross-sectional view along line 3—3 showing the detail of the grooves for forming the cords in the crown of the mold.

FIG. 4 is a plan view of a fabric ply showing the detail of the fabric and means for molding filament in a unitary body.

FIG. 5 is a partial view of two fabric plies with the bead of one positioned and resting in a mated relationship inside the recess of the bead section of the other ply.

FIG. 6 is a cross-sectional view through the finished tire.

FIG. 7 is a cross-section through a curing press in closed position.

FIG. 8 is a cross-section through a curing press in the open position showing the cured tire ready to be stripped from the mold.

FIG. 9 is an enlarged cross-sectional view along the cord path of one embodiment of the first ply.

FIG. 10 is an enlarged cross-sectional view along the cord path of one embodiment of the second ply.

Referring specifically to FIG. 1, numeral 11 identifies the bottom half of a ply mold and numeral 12 identifies the top half of said ply mold. The top and bottom halves are shown in FIG. 1 in mated relationship with ports 14 positioned for injecting in the material to form the molded fabric reinforcing member and an exhaust or vacuum port 15 is shown positioned on the outside circumference of the mold to facilitate removing air and obtaining the desired inert gas blanket or vacuum within the mold. It should be appreciated that the inlet and outlet ports 14 and 15 respectively will be placed around the mold as needed to facilitate filling the mold. Also, in FIG. 1 is shown a collapsible core 16 having segments 17, 18 and 19, etc. which permits the mold easily and quickly to be opened and the fabric ply to be removed.

The nature of the new ply more readily may be understood by reference to FIG. 2 where the molded cord or fabric 20 is shown having bands 21 and 22 for holding the individual parts, viz. filaments in the desired relationship as the plies are removed from the ply mold and placed in the mold for forming a tire. The tie bands 21 and 22 also form another useful function as they all tend to give the plies the desired spacing within the tire mold and thus will reduce the amount of friction between one ply and another ply.

It should be noted that the individual cords in the ply terminate in the bead section 23 and that in the first ply the bead section is notched to receive the ridge molded into the bead section of the second ply which may be more readily seen and appreciated in FIG. 5 where the ridged bead of the second ply 25 rests within the notched bead of the first ply to thereby allow the two plies to rest in a unitary relationship to form the unitary bead section 26. Thus, by this means of construction it is possible to form the cord plies per se by injecting the cord forming material into the inlet ports 14 to fill the grooves 27 more clearly shown in FIG. 3. When the grooves 27 of the mold have been filled and the filament-forming material set, the fabric may be removed from the mold by opening the mold to give a ply having the details more clearly shown in FIG. 4.

It should be readily apparent that it is possible to form plies having a cord path having either a right-hand or left-hand relationship where the first ply is formed in a mold having a cord path that gives a cord having a left-hand bias or legt-angle configuration and the second ply is formed in a mold having a right angle or bias configuration.

This invention is readily amenable to use of any cord path, as well as use of reinforcing breakers and use of any' bead shape or combinations of materials whereby the tire design can be molded precisely as desired by the designer.

When the desired number of plies have been formed then the plies are placed in the mold and the tie 21 and 22 hold the plies away from the mold and in the desired spaced relationship. Then the plies in the mold can be formed into a tire by suitable injection of elastomeric material to give a tire having the cross section more readily shown in FIG. 6. The tire mold used in forming the tire using plies formed in the manner described in accordance with this injection may be more readily understood by reference to FIG. 7 which shows the closed mold having the plies placed in position and ready to receive a suitable injection of rubber material to form the sidewall and tread section as it would be familiar to those of ordinary skill in the art. Then reference to FIG. 8 shows the mold in the open position ready to permit the molded tire to be removed from the mold to give a tire having the cross section shown in FIG. 6.

The material used to form the cords or plies of this invention are broadly of the thermoplastic thermosetting type which may be melted and injected into the ply mold through the ports 14 and then be set or solidified to give a ply that can be removed. The preferred materials for forming the plies of this invention are the polyamide resins and the polyester resins. In the polyamide resins it is specifically desirable to utilize liquid lactams containing the desired catalysts and promoters which may be injected in the ply mold and then be polymerized and set to give a finished nylon fabric ply. The nature of this art is readily understood and more particularly described in the patent art by U.S. Pat. Nos. 3,448,085 and 3,017,391. Also, specifically preferred is the higher melting polyamides such as those available under the name "Kapton" from E. I. duPont deNemours & Company, as well as the polyimide type resins or Milar type polyesters.

Representative of the many polyesters that are used for tire cords is the terephthalates of ethylene glycol and copolymers of terephthalic acid with phthalic and isophthalic acid. These materials having suitable intrinsic viscosity may be melted and injected into the cord mold to form the tire ply. It is also desirable that the various well-known techniques such as intrinsic viscosity jumpers be used to further enhance the viscosity to give a polyester that is less readily melted and having improved heat characteristics.

Once the tire ply has been formed and placed in the mold the ply may be covered with an elastomeric material such as the liquid polyurethane reaction mixtures or those so-called encapsulated rubber dispersions in a suitable extender oil which when injected into the tire mold and heated to the cured temperature, cures to give essentially a homogeneous elastomer. The nature of these elastomeric materials and their preparation are well known and illustrated in the following recent patents: Canadian Pat. No. 860,084 and French Pat. No. 1,526,075.

In one method of building a tire, the steps comprise molding fabric plies of the desired bias angle, placing said plies in a tire mold and locking the plies together in the bead area to position the plies relative to each other and the mold, filling the cavity between the plies the the closed mold with an elastomeric precursor and heating to set the precursor around the plies to give a cured tire.

EXAMPLE I

A ply mold of the type shown in FIG. 1 and related drawings is connected to a pressurized extruder by ports 14 and a vacuum of 5 p.s.i. (pounds per square inch) pulled on ports 15. The extruder is charged with a molding grade polyamide Kapton, a trademark of E. I. duPont deNemours & Company, and worked as the temperature of the extruder was sufficient to permit the Kapton as a semi fluid-to-fluid mixture to be forced into the cavity of the ply mold to fill the grooves thereof. The mold is cooled below melting point of the polyamide to solidify the polyamide in the cavity so the ply could be removed when the mold is open.

A second ply is molded in like manner. Preferably the first ply is molded in a mold to give the filament a left-hand bias and the second ply is molded to give its filaments a right-hand bias. The plies are then placed in the mold to cause the bead of the second ply to nest in the bead of the first ply in the manner shown in FIG. 5. With the plies positioned in the mold, the mold is closed and an elastomeric tire extruded around the plies by injecting suitable fluid elastomer or elastomeric precursor into the mold to fill it.

Satisfactory fluid elastomers for this purpose are those shown in Examples A and B as well as the other examples of French Pat. No. 1,526,075.

The following examples are given by way of illustration but not limitation of the many elastomers and elastomer precursors known and useful in this invention, and all parts are expressed in weight, except for contrary indication.

EXAMPLE A

This example illustrates the method of applying a surface film to rubber particles mixed by spray drying, and the formulation of a fluid mixture with two phases by dispersing the spray dried particles in a dispersion liquid.

A solution in hexane of a polybutadiene containing about 15 percent polybutadiene is mixed in solution by mixing, with agitation, with the following mixture ingredient:

| | |
|---|---|
| Polybutadiene | 100 |
| Carbon black* | 68 |
| Zinc oxide | 2 |
| Stearic acid | 2 |
| Antioxidant | 1.5 |
| Sulfur | 2 |
| Accelerator | 1.5 |
| Total | 177 |

*Furnace black of highly abrasive intermediate grade.

The fluid mixture is adjusted to a total content of solids of 20 percent by evaporating excess hexane which may have been added as vehicle for some pigments.

A certain amount of the above mixed rubber mastic is emulsified in an aqueous 10 percent solution of polyvinyl alcohol (Elvanol 50–42 which is a trademark of E. I. duPont deNemours & Company and which is composed essentially of polyvinyl alcohol and esterfied derivatives), by using a sufficient amount of this latter to provide one part of polyvinyl alcohol per 3 parts of compounded rubber (that is, polybutadiene plus pigments). An Eppenbach homogenizer or equivalent high shearing assembly to carry out the emulsification of the compounded rubber mastic and to produce small particles having a diameter essentially between 1 and 30 microns. The polyvinyl alcohol serves as colloidal stabilizer for the system of particles, and subsequently as barrier around the spray-dried particles. The hexane is evaporated from the system with stirring, in order to leave a system of compounded rubber particles. A certain amount of water is removed with the hexane, but is replaced to provide a total final content of solids of 20 to 25 percent.

The aqueous dispersion, free from hexane, of the compounded rubber, is spray dried to obtain fine particles of compounded rubber coated with polyvinyl alcohol, the ratio of the weight of the rubber to the coating being 75:25. The particles obtained in this manner are mixed with a rubber diluting oil of the paraffinic type in the proportions of about 60 parts of oil per 100 parts of particles in order to form a fluid rubber paste. The mixture remains fluid at ambient temperature so it can be made to flow into a mold cavity, where it can be subjected to a temperature of 143°C. in a hydraulic press for 60 minutes. The initially fluid rubber composite is transformed into a solid and firm vulcanizate.

The product of Example A can be varied to obtain a range of values of the ratio of the polyvinyl alcohol to the rubber, by varying the resistance of the encapsulated particles to the oils and to the plasticizers used as liquid component of the rubber composition in two phases. For example, the thickness of the coating may be reduced so that the ratio of the rubber to the coating is 97:3. The storage time of the fluid rubber composition thus varies within a wide time range.

The product may also be varied in regard to the polymeric film-forming material used to apply a coating to the particles. The materials soluble in water or capable of being dispersed in water that may be used as gelatin, gum arabic, a copolymer of styrene and maleic anhydride (for example, Lytron), copolymers of methyl and vinyl ether and maleic anhydride (for example, Gantrez, a trademark of General Aniline & Film Corporation), methyl cellulose, hydroxyethyl cellulose, polyvinyl pyrrolidone, a dextrin, a carboxylated dextrin, block copolymers containing hydrocarbon polymer blocks and polyether blocks such as polyethylene oxide, block copolymers of different alkylene oxides, polymers and copolymers of acrylic acid and numerous other materials.

The formula for vulcanizing the rubber may be varied at will.

The product may again be modified in regard to the nature and the amount of liquid dispersion agent in which the encapsulated particles (surrounded by a barrier layer) are put in suspension. The liquid dispersion agent may be used in amounts between 25 and 150 parts per 100 parts of particles. The liquid dispersion agent may be any of the classic rubber diluting oils or mixtures of these, with or without supplementary amounts of other liquids to increase or decrease the viscosity or adjust the characteristics of the fluid rubber in another manner.

Plasticizers of the ester type (mono- and poly-esters), polyglycols, ethers and formals may be used. It is usually desirable to adapt the liquid dispersion agent to the materials of the surface film of the particles, or conversely, so as to obtain a satisfactory resistance time of the particles to the diffusion to their interior of the liquid dispersion agent.

EXAMPLE B

A solution in hexane of a polybutadiene containing about 15 percent polybutadiene is mixed in solution by mixing it, with stirring, with the same compounding ingredients as those used in Example 1 or with other suitable vulcanization ingredients. The liquid mixture is adjusted to a total solids content of 20 percent by evaporating the excess hexane which is added as the vehicle for some pigments.

A certain amount of the above mixed rubber mastic is emulsified in an aqeuous solution with 10 percent of a gelatin (super-clarified "Atlantic" gelatin of the A, low Bloom type) by using a sufficient amount of this latter solution to provide one part of gelatin per 2 parts of compound rubber (that is, polybutadiene plus pigments). An Eppenbach homogenizer is used to emulsify the liquid mastic. The gelatin serves initially as stabilizer for the colloidal system, and later as barier around the rubber particles.

The hexane is evaporated from the system by agitating, for example in a disk, concentrating apparatus of the type used to increase the total solids content of the latex. A part of the water is removed with the hexane, but it is continuously or intermittently replaced to maintain the total solids content between 20 and 25 percent (compounded rubber plus gelatin).

The micro-encapsulation of the rubber particles is carried out in the following manner: the hexane-free dispersion of compounded rubber particles in solution in gelatin which is obtained is taken to 50°C. and subjected to a separation of the gelatin on the rubber particles, the coacervation being effected by slow addition of 460 cm$^3$ approximately of an aqueous solution with 20 percent sodium sulfate to about 1150 grams of this dispersion of rubber particles in solution in gelatin at 50°C. by stirring continuously. The gelatin is hardened around the rubber particles at a lower temperature by pouring the mixture with stirring into 2.08 liters of a 7 percent solution of sodium sulfate between 0° and 10°C. and by maintaining the temperature at this level. The encapsulated particles are washed by allowing them to settle in the aqueous system maintained between 0° and 10°C., by decanting the supernatant aqueous phase, by adding a supplemental amount of cold water (0°–10°C) and by dispersing the particles. This series of operations may be repeated several times. The final dispersion of rubber particles coated with gelatin may be dried by spray drying to isolate them. Or else they may be treated with formaldehyde to harden the capsule surrounding each particle, on which the particles may be recovered by filtration or by spray drying. Any previously mentioned process of coacervation may be adopted to deposit a film around rubber particles, and any process for recovery of the particles coated with a film by coacervation may be used in place of that described more particularly in this example.

The dried encapsulated rubber particles are mixed with a plasticizer such as a rubber diluting oil to form a fluid mixture, which may be used in tire molding operations and then be followed by a heating to form vulcanized rubber products.

In another embodiment, the fluid elastomeric precursors are chosen and compounded preferably to be those well known to the rubber compounder as tread stocks and carcass stocks. Then the fluid tread stock is injected into mold 28 through tread injection ports 29 and the fluid carcass stock is injected into the mold through carcass injection parts 30. The cured tire, which has been heated to curing temperature 250°–350°F. is then removed from the open press mold 31 of FIG. 8 to give a finished tire 32. Reference to FIG. 6 shows the tread 33, preferably of a specially compounded tread stock of high cis polybutadiene and a carcass rubber 34 enveloping the plies and terminating in a bead foot 35.

While certain representative embodiments and details have been shown for the purpose of illustrating the invention, it will be apparent to those skilled in this art that various changes and modifications may be made therein without departing from the spirit or scope of the invention.

What is claimed is:

1. A method of building a tire consisting essentially of molding a ply of the desired angle, placing at least one ply in a tire mold in the desired spaced relationship relative to the tire mold and any other ply present in the mold to leave a space between the other ply and the tire mold when closed and positioning a bead portion of said one ply in a corresponding recess of said second ply to lock the plies together, filling said space with an elastomeric precursor and heating to set the precursor around each ply to give a cured tire when removed from the tire mold.

2. The method of claim 1 wherein the plies are formed from molten polyamide or polyester.

3. The method of claim 1 wherein the ply is molded from a mixture of a liquid lactam, catalyst and promoter.

4. The method of claim 1 wherein each ply is composed of multiple filaments formed at the desired angle.

5. The method of claim 1 wherein the plies are formed from molten polyamide and the elastomeric precursor is an encapsulated rubber dispersed in a plasticizer.

6. The method of claim 5 wherein the elastomeric precursor is a polybutadiene.

* * * * *